Figure 1:
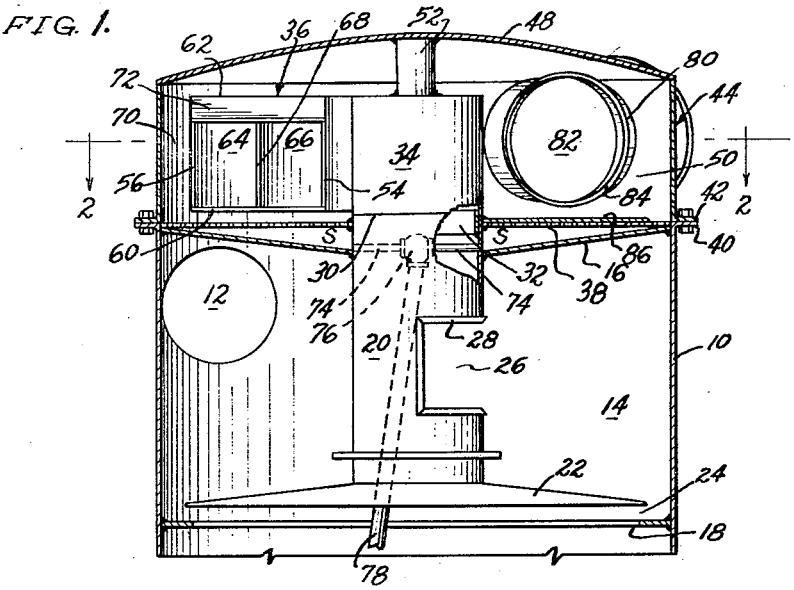

Aug. 21, 1956

R. B. BOURNE 2,759,558

STEAM AND WATER SEPARATOR FOR SEA
WATER EVAPORATORS OR THE LIKE

Filed July 31, 1953

2 Sheets-Sheet 1

INVENTOR.
ROLAND B. BOURNE

BY Roger B. McCormick

ATTORNEY

Aug. 21, 1956

R. B. BOURNE 2,759,558

STEAM AND WATER SEPARATOR FOR SEA
WATER EVAPORATORS OR THE LIKE

Filed July 31, 1953

2 Sheets-Sheet 2

INVENTOR.
ROLAND B. BOURNE

BY Roger B. McCormick

ATTORNEY

United States Patent Office 2,759,558
Patented Aug. 21, 1956

2,759,558

STEAM AND WATER SEPARATOR FOR SEA WATER EVAPORATORS OR THE LIKE

Roland B. Bourne, West Hartford, Conn., assignor to The Maxim Silencer Company, Hartford, Conn., a corporation of Connecticut Application July 31, 1953, Serial No. 371,577

8 Claims. (Cl. 183—82)

This invention relates to a separator for producing dry steam from a mixture of steam and entrained water. Separators incorporating the features of the present invention may be used to particular advantage in the construction of evaporators which are installed aboard ship to distill fresh water from sea water for drinking or other usage.

It is believed that the separator of this invention can most advantageously be used as the secondary separator in the sea water evaporator and, accordingly, the invention will be described in this preferred environment. In so describing the invention, it will be unnecessary to describe in detail the conventional components of the evaporator, such components being fully described in U. S. patent to Williamson et al., No. 2,604,957, and in the co-pending application of Williamson et al., Serial No. 90,528, filed April 29, 1949, now Patent No. 2,649,408.

As more fully set forth in the aforementioned patent and application, it is conventional practice to provide in a sea water evaporator three distinct chambers within a generally vertically disposed shell, said chambers comprising, in bottom-to-top order, a boiler chamber, a primary separating chamber, and a secondary separating chamber. The sea water is heated in the boiler chamber and wet steam driven off by heating is collected and directed through a pipe which extends from the boiler chamber externally of the shell and upwardly of the shell and into the upper part of the primary separating chamber. It is conventional practice to introduce this wet steam mixture tangentially into the primary separating chamber. The wet steam mixture separates with water droplets being thrown outwardly by centrifugal force and the drier steam being collected inwardly as the steam mixture is whirled within the primary separating chamber. It is conventional practice to locate conduit means for collecting the steam in the central portion of the primary separating chamber and to direct the same upwardly into the secondary separating chamber where more moisture is driven from the mixture. Then, the dry steam is directed out of the evaporator shell through a conduit to a condenser which condenses the steam for drinking and other fresh water needs.

The purity of the distilled water depends upon the amount of water that is driven from the steam within the evaporator. Substantially no salt remains in completely dry steam and all of the salt is carried by and within the water droplets. The conventional sea water evaporators have been remarkably successful, but it has been found that performance can be very substantially improved upon by incorporating a secondary separator of the type to be described herein. Not only does the secondary separator of this invention improve the performance characteristics of the evaporator, but it also prevents a great deal of water re-entrainment after the steam has been substantially dried within the evaporator and before it is discharged to the condenser.

Accordingly, it may be said that it is the general object of the present invention to provide a separator structure such as can be conveniently included in the construction of sea water evaporators and which improves the performance characteristics thereof.

Another object of the invention is to provide a separator for a sea water evaporators such as can be easily and expeditiously included in the evaporator structure and which requires comparatively little room to be maneuvered and handled in the assembly or re-assembly after periodic cleaning of the separator and the evaporator.

It is an important object of the invention to provide a separator which will improve the performance of an evaporator to a point heretofore unattained and which will be substantially foolproof in operation and require very little effort to service and clean the same.

Figure 2:
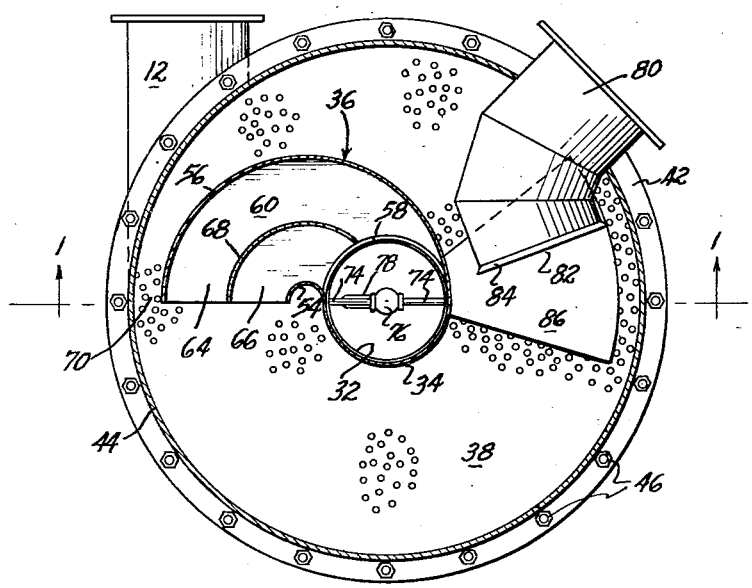
Figure 3:
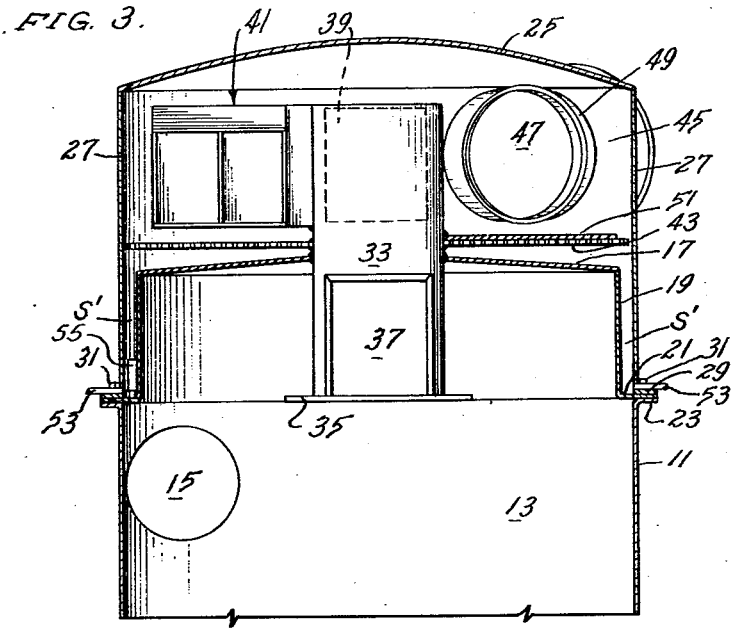

Other more specific objects and features of the invention will become apparent to those skilled in the art from the following description of the annexed drawings which, by way of example only, illustrate a preferred embodiment of the invention and one alternative form of construction and in which, Fig. 1 is a vertical sectional view taken through the primary and secondary separator chamber sections of an evaporator shell with parts shown in elevation;

Fig. 2 is a horizontal sectional view taken as indicated by the line 2—2 of Fig. 1 with parts shown in plan; and Fig. 3 is a view generally similar to Fig. 1 but showing an alternative form of construction.

Without specific reference to the drawings, the separator of the present invention may be described as including a generally cylindrical shell having transverse walls or headers defining a chamber wherein there is disposed means adapted to introduce a whirling motion to a steam and water mixture to separate water from the mixture by centrifugal force. An important component of the separator is an outlet conduit which extends upstream with respect to the path of movement of the whirling mixture. It is important to observe that the extending portion of the outlet conduit is spaced from the shell and from all other walls defining the chamber or disposed within the chamber. With this arrangement of the outlet, a portion of the steam whirling within the chamber "wipes" along the conduit to prevent separated water from creeping towards the opening of the conduit for re-entrainment with the steam in the outlet conduit. The said opening of the outlet conduit is preferably disposed in the end thereof to face upstream of the whirling steam and substantially normal to its path of movement. With the aforedescribed dispostion of the outlet opening, entrance losses are minimized and steam is received within the outlet conduit with the least amount of work or energy expended.

While there are apparently many different means for introducing the whirling motion to the steam and water mixture as, for example, a tangentially disposed inlet conduit for the mixture, it is preferred that the whirl inducing means be adapted to receive the mixture from a centrally and axially disposed inlet conduit. As will be described in greater detail hereinafter, there is provided means for defining a volute passageway from the central inlet conduit to the peripheral portion of the separating chamber. The discharge opening from the volute passageway is also spaced from the bounding walls of the chamber so that whirling steam may pass between the wall of the shell and said discharge opening to provide a "cushion" which prevents water droplets from striking directly against the wall of the shell at the said discharge opening and splashing back for re-entrainment with the steam centrally of the chamber.

Accordingly, the steam and water mixture which enters the chamber is whirled therewithin so that the water will be separated and strike the wall of the shell at an acute angle to prevent splash-back. The water collected along the wall of the shell drains downwardly to the bottom of the chamber and a perforate plate is disposed across the chamber to prevent water from splashing upwardly and back into the whirling steam.

Another important feature of the invention resides in the disposition of the opening into the outlet conduit with respect to the discharge opening of the volute passageway. It has been found most advantageous to locate these openings in radial planes and facing in opposite circular directions with their planes separated by a substantial arc to permit substantially complete separation of the water and steam therebetween.

The aforementioned important features of the invention will be re-emphasized in the more specific description which follows.

In Fig. 1 there is shown the upper portion of a cylindrical shell 10 which, in accordance with conventional practice, defines in its lower regions a boiler chamber for heating sea water and driving off wet steam. As previously mentioned, the wet steam is directed externally of the shell 10 by conduit means (not shown) to an inlet conduit 12 which extends tangentially into the upper region of a primary separating chamber 14 defined within the upper part of the shell 10 by a conically shaped end header 16 which has its concave surface facing upwardly.

Most of the salt-retaining water is driven from the wet steam by centrifugal force and the water runs down the inner surface of the shell and over an inwardly extending ring 18 secured to the shell in the lower part of the separating chamber 14. The water is then collected beneath the separating chamber for return to the boiler chamber. The relatively dry steam collects within the central portion of the separating chamber 14 and a large diameter vertically arranged conduit 20 is disposed to receive the steam and remove it from the separating chamber. More specifically, the conduit 20 is fixed within a central aperture in the end header 16 and extends downwardly to the lower portion of the separating chamber 14. The bottom end of the conduit 20 is closed by a conical plate 22 which extends radially outwardly into relatively closely spaced relationship with the shell 10 and ring 18 to define a gap 24 for the flow of water from the separating chamber. The concave surface of the plate 22 faces downwardly and the plate prevents water from splashing into the separating chamber from the area below.

The inlet to the conduit 20 is provided by a side window 26 which is defined by a skirt 28 arranged to prevent entrance losses and to prevent moisture, which may form or collect on the outer surface of the conduit 20, from entering the inlet opening 26. At this point, it should be stated that sea water evaporators are adapted for large capacity operation. For many installations, it is required that a single evaporator produce 10,000 or more gallons of distillate per day. Accordingly, the evaporator must produce an enormous amount of steam and it will be understood that in order to fulfill the volumetric requirements of the evaporator, the relatively wet steam must be circulated within the primary separating chamber 14 at a high velocity. The aforedescribed side window opening 26 into the conduit 20 is particularly adapted to receive the high velocity whirling stream of relatively dry steam. The relatively dry steam enters the opening 26 with a whirling motion (counterclockwise as viewed in Fig. 2) and continues to whirl within the conduit 20 as it passes upwardly therein under pressure from the primary separating chamber 14.

A centering ring 32 is secured within the upper end of the conduit 20 as by welding or the like and extends beyond the upper end to receive and center a cylindrical extension 34 which constitutes a portion of a member indicated generally by the reference numeral 36. A perforate metal plate 38 is also secured adjacent the upper end of the conduit 20 to extend outwardly therefrom or transversely of the shell and is secured as by welding or the like adjacent its marginal edge to the peripheral portion of the end header 16.

Adjacent said peripheral edge of the end header 16 the shell 10 is provided with a radially outwardly extending flange 40 which receives a complementary flange 42 on a dome-like covering shell 44 and is secured thereto as by bolts 46, 46. As shown in Fig. 1, the dome-like shell 44 has an arcuate end header 48 with the concave surface thereof facing downwardly. Said dome or shell defines the secondary separating chamber 50 in accordance with the present invention and houses the components utilized in effecting final separation of the water from the steam.

As previously mentioned, a member 36 is provided with a generally cylindrical portion 34, closed at its upper end, which constitutes an extension of the conduit 20. The member 36 is supported by and within the dome 44 by means of a cylindrical support member 52 which extends between and is secured to the arcuate header 48 and the end closure of the cylindrical portion 34 of member 36. The member 36 is supported in such position within the dome 44 so that when the cylindrical portion 34 is located on the conduit 20 by the centering ring 32, the flange 42 will overlie the flange 40 on the shell 10 for connection therewith. It will be understood that the dome 44 and its associated components can be brought into position for assembly with the shell 10 with very little vertical head room, because it is only necessary to lift the cylindrical portion 34 of the member 36 slightly to effect clearance from the centering ring 32 and then the entire dome structure can be shifted laterally with respect to the shell 10.

As best shown in Fig. 2, the member 36 has inner and outer walls 54 and 56, respectively (formed from the same metal sheet which defines the cylindrical portion 34), which define a volute chamber communicating with the conduit 20 through a side opening 58 in the cylindrical extension 34. The said volute chamber is further defined by bottom plate 60 and top plate 62 which provides the previously mentioned top closure for the cylindrical portion 34. The said chamber is divided into two passageways 64 and 66 by an arcuate wall 68 which extends between the bottom and top plates 60 and 62 and which is substantially concentric to the volute forming walls 54 and 56. It will be noted with reference to Fig. 2 that the volute passageways 64 and 66 are directed or extend counterclockwise from the cylindrical extension 34 on the conduit 20. Accordingly, the whirling, relatively dry steam within the conduit can follow its counterclockwise whirl path into said passageways without any increase in back pressure as would arise if the passageways 64 and 66 were otherwise directed.

It will be understood that the relatively dry steam received from the conduit 20 within the member 36 is directed in a volute whirl path through the channels 64 and 66 towards the wall of the dome 44. The outer wall 56 of the member 36 is spaced from the wall 44 to define a gap 70 therebetween for a purpose which will be described hereinafter. A plate 72 is fixed to the member 36 across the top of the discharge openings of the passageways 64 and 66 in visor-like disposition to direct the relatively dry steam mixture downwardly as it enters the secondary separating chamber 50. This prevents water droplets from collecting on the inner surface of the arcuate header 48 at the top of the dome. The relatively dry steam mixture which emerges from the passageways 64 and 66 in the member 36 is whirled about within the secondary separating chamber 50. The heavier water droplets are collected on the vertical wall of the dome and on the perforate plate 38. The water thus collected drains through the perforate plate onto the conical end header 16 which closes the shell 10. Thus, a sump S is defined between the perforate plate 38 and the end header 16 and water collecting therein is drained through pipes 74, 74 extending transversely of the conduit 20 to a pipe union 76 which is connected to a downwardly extending drain pipe 78 disposed within the said conduit and extending downwardly through the conical plate 22 to the region of the shell 10 wherein the water is collected for return to the boiler chamber. The perforate plate 38 is provided to prevent splashing of water from the sump S and possible reentraining of said water in the whirling steam. Most of the water carried by the steam from the member 36 is directed at a very small angle to the perforate plate 39 and so the perforate plate collects water without any material splashing.

The provision of the previously described gap 70 also prevents splashing of the water droplets from the wall of the dome into the whirling steam. More specifically, the gap 70 permits 360° circulation of a portion of the steam within the chamber 50. The circulating steam provides a cushion which deflects water droplets discharging directly from the channels 64 and 66 so that the said water droplets will not strike the wall at a substantial angle and with sufficient force to splash back into the circulating steam.

The outlet for the secondary separating chamber 50 is provided by an elbow conduit 80 which has its opening 82 positioned substantially normal to the path of the circulating steam. The said opening 82 is defined by an outwardly diverging skirt 84 to reduce entrance losses and it will be seen that the opening 82 is so positioned as to require little work in overcoming the centrifugal forces of the circulating steam. The said opening of conduit 80 is located with respect to the discharge of the member 36 so that the steam will traverse at least 170° of arc within the separating chamber 50. While the aforementioned arc may fall between approximately 170° and approximately 210° for satisfactory results, I prefer that the steam travel through more than 170° of arc.

It is important to note that while the opening 82 to the outlet conduit 80 dominates the cross-sectional area of the secondary separating chamber 50 where the steam circulates, the said opening 82 is spaced from all walls defining the chamber 50 and all walls disposed therewithin. More specifically, the open end of the conduit 80 is spaced from the cylindrical extension 34, the side and top of the dome, and the perforate plate 38 by substantially equal distances. This permits a portion of the circulating steam to travel beyond the opening 82 and traverse a 360° path within the chamber 50. In so doing, the steam wipes the upstream extending portion of the outlet conduit 80 to prevent water droplets which may collect thereon from "creeping" towards the opening 82. In order to take full advantage of the wiping action of the circulating steam, the conduit 80 should project upstream in the circulating path by an amount at least equal to one-quarter the diameter of the outlet conduit. The particular angular disposition of the conduit 80 is not of the essence and various other forms of conduits may be used.

It has been found that the 360° circulation of a portion of the steam provides advantages other than the aforedescribed "wiping" action on the discharge conduit. It has been found that by circulating a portion of the steam through 360° within the separating chamber turbulence and eddy currents in the stream are avoided and surges in the stream are also avoided. As a result, the entire circulation of the stream is quite smooth and the possibility of picking up or re-entraining water within the stream by stream turbulence, etc. is substantially eliminated. It is believed that the 360° circulation of a portion of the stream is not the only factor in providing turbulent-free movement. Experience has shown that the spaced location of the volute conduit within the separating chamber is also a vital factor for smooth, turbulent-free circulation and discharge.

It is also important to prevent water from escaping the sump S through the perforate plate 38 adjacent the opening 82 to the outlet conduit 80. To this end, I provide an imperforate plate 86 which is secured atop said perforate plate and to the conduit 20 adjacent its top edge. The said plate 86 extends radially outwardly from the conduit toward the peripheral margin of the perforate plate but leaves a marginal portion of the perforate plate open for drainage purposes. The joint between the imperforate plate 86 and the conduit 20 should be watertight to prevent "creep" of water along the surface of the conduit upwardly into the entrance region of discharge conduit 80. It has been found that if the plate 86 extends upstream of the conduit entrance 82 by an amount approximately equal to the diameter of conduit 80 and if it extends downstream from said entrance by an amount approximately equal to one-half of the diameter of said conduit, the said plate 86 will effectively stop water entrainment in the discharge stream from the sump S. Such entrainment is ordinarily occasioned by "suction" at the entrance to the discharge conduit.

Since the sea water evaporators to which the separator of the present invention may be advantageously applied are subjected to tilting when installed aboard ship, it may be of greater advantage to provide the separator-evaporator combination of this invention in the embodiment shown in Fig. 3. This embodiment incorporates an alternative construction which is particularly adapted to collect separated water in any tilted position. More specifically, as shown in Fig. 3, a generally cylindrical shell 11 defines a primary separating chamber 13 wherein wet steam is introduced through a conduit 15 in the conventional manner. The shell 11 is not closed by a top header of the previously described type, but in place thereof it is provided with a conical wall or partition 17 which is spaced substantially above the top end of the shell 11 and which is secured to the top edge of an inner cylindrical shell 19 having a diameter less than the diameter of the shell 11. The bottom of the inner shell 19 is provided with a radially extending flange 21 which overlies a complementary flange 23 formed on the shell 11. Thus, the conical partition 17 and the inner shell 19 are supported by the shell 11.

A dome-like cover is again provided for the evaporator, the said cover comprising an arcuate top header 25 and a cylindrical side wall 27 equal in diameter to the shell 11. The lower end of the cylindrical side wall 27 is provided with a flange 29 which overlies the shell flange 23 and the inner shell flange 21 and which is secured thereto as by bolts 31, 31. As clearly shown in the drawings, the space S' between the inner shell 19 and the cylindrical wall 27 of the cover takes the form of an annular well or sump for the collection of the separated water, as will be described in greater detail hereinafter.

To provide drainage of the separated water into the sump S', the concave surface of the partition or wall 17 faces downwardly. A suitable aperture is centrally located in the wall 17 to receive and secure a vertically disposed collecting conduit 33, which extends downwardly into the primary separating chamber 13 and which terminates in substantially the same plane as the bottom of the inner cylindrical shell 19. The bottom of the conduit is closed by a circular plate 35 and a side window inlet 37 is provided adjacent said plate 35 to receive relatively dry steam from the primary separating chamber. The conduit 33 extends upwardly from the partition 17 a substantial distance and a side window outlet 39 is provided therein to discharge the relatively dry steam into a member 41 which is substantially identical to the previously described separating member 36.

In much the same manner previously described, a perforate plate 43 is secured to the conduit 33 to extend transversely thereof to a point in adjacency to the side wall 27 of the dome-like cover, but is not affixed thereto. Thus, the plate 43 co-operates with the said dome-like cover to define a secondary separating chamber 45 within the cover.

The steam-water separation within the secondary separating chamber 45 is carried out in a fashion identical to the previously described separation of the steam and water in the embodiment of Figs. 1 and 2. That is, the relatively dry steam is discharged from the member 41 within the separating chamber 45 through an arc of at least 170° to the opening 47 of an outlet conduit 49 which is substantially identical to the previously described outlet conduit 89. There is provided an imperforate plate 51 located beneath the opening 47 to the outlet conduit 49.

The water separated from the relatively dry steam in the secondary separating chamber 45 will, similarly to the manner previously described, collect along the walls of the secondary separating chamber and be received by the perforate plate at the bottom thereof. In the embodiment of Fig. 3, the separated water will drain through the perforate plate onto the partition 17 which closes the inner shell 19. Thus, the water will drain from the partition 17 outwardly into the annular sump S' located adjacent the cylindrical wall of the dome-like cover of the evaporator. The water is drained from the sump through a plurality of tubes or pipes 53, 53 located in circumferentially spaced positions at the bottom of the sum S' to extend through the cylindrical side wall 27 of the dome-like cover. It will be quite apparent that drainage can thus be effected from the sump no matter to what angle the evaporator is tilted in the roll of a ship. During roll of a ship there may be a tendency for the water to splash within the sump S'. To prevent undesirable splashing, a plurality of circumferentially spaced vanes, such as the vane 55 (Fig. 3), are fixed along the inner shell wall 19 to extend into the sump.

It will also be noted that the alternative form of construction in Fig. 3 differs from the previously described embodiment in that the conduit which collects the relatively dry steam from the primary separating chamber and transfers the same to the secondary separating chamber is supported by the partition or wall 17 which in turn is fixed to the top of the inner shell 19. Thus, by removing the bolts 31, 31 the dome-like cover and the inner shell with the attached components of the secondary separator can be removed from the evaporator shell 11 by lateral movement. Accordingly, the evaporator-separator apparatus of the present invention can be assembled in restricted spaces and the components making up the secondary separator removed from the evaporator for cleaning and inspection without requiring additional head room. After the inner shell and dome-like cover have been removed from the main shell of the evaporator, the dome-like cover can be lifted vertically from the inner shell 19 and partition 17. The said inner shell and partition will then independently support the conduit 33, the separating member 41, and the perforate and imperforate plates 43 and 51, respectively.

Tests of sea water evaporators incorporating the aforedescribed secondary separator have clearly indicated that the salinity content of distillate reaches a heretofore unattained low of approximately .04 grain per gallon, while the sea water capacity has been increased by as much as 50% as compared to evaporators of substantially equal size or requiring substantially equal space for installation. It is also important to note that the evaporator-separator combination described is substantially foolproof in operation and requires a minimum of labor for maintenance and the like. When it becomes necessary to clean or inspect the sea water evaporator described, such inspection and cleaning can be accomplished with a minimum of effort.

While two specific embodiments of the invention have been described in detail, I realize that other alternative forms of construction can be effected within the scope of the present invention and, therefore, it is not my intention to limit the invention to the described embodiments otherwise than indicated by the claims which follow.

I claim as my invention:

1. A steam and water separator comprising a generally cylindrical and vertically disposed shell having a pair of spaced-apart transverse walls defining a separating chamber therebetween, a centrally disposed inlet conduit for a steam and water mixture extending into said chamber from one of said transverse walls, means secured to said inlet conduit within said chamber defining a generally horizontal volute passageway in communication with the conduit and having an outlet disposed in spaced relationship to said shell and said transverse walls in a substantially radial plane in the chamber whereby the steam and water mixture is introduced to the chamber in a whirling path of movement, and a steam outlet conduit extending through said shell and into the chamber in a generally horizontal plane, said outlet conduit having an open end spaced from said inlet conduit and said shell and said transverse walls in a substantially radial plane in the chamber and facing upstream with respect to the path of movement of the mixture, and the open end of said outlet conduit being spaced from the outlet of said passageway through an arc of at least 170°.

2. A steam and water separator comprising a generally cylindrical and vertically disposed shell having upper and lower transverse wall members defining a separating chamber therebetween, a generally vertically disposed inlet conduit for a steam and water mixture extending into said chamber through the central portion of said lower transverse wall, means defining a generally horizontal volute passageway in communication with said inlet conduit and having an outlet spaced from said shell and said transverse wall members and disposed in a substantially radial plane through the chamber to introduce the mixture therein in a generally circular path of movement, a steam outlet conduit extending into said chamber and having an open end spaced from said shell and said transverse wall members and facing into said path of movement, the said open end of the said outlet conduit also being spaced from the outlet of said passageway through an arc of at least 170° and disposed in a substantially radial plane through the chamber, said lower transverse wall member having a sloping surface to drain water separated from the mixture within said chamber, and a perforate plate extending transversely from said inlet conduit to said shell above said lower transverse wall member to prevent water from splashing into said chamber.

3. In a sea water evaporator, the combination comprising a substantially vertically disposed shell defining a generally cylindrical primary separating chamber, an inlet conduit for wet steam opening substantially tangentially into said primary chamber, transverse wall means in said shell defining a generally cylindrical secondary separating chamber above said primary chamber, a conduit extending through said wall means having an opening within said primary chamber and an opening within said secondary chamber, said conduit being adapted to receive relatively dry steam in said primary chamber and to transfer the same to said secondary chamber, means in said secondary chamber defining a volute passageway in communication with the conduit opening in said secondary chamber, said volute passageway having a discharge opening adapted to introduce the relatively dry steam to the secondary chamber in a whirling stream moving in the same direction, as the wet steam in said primary chamber, and an open end steam outlet conduit extending into said secondary chamber and upstream a substantial distance with respect to the path of movement of the relatively dry steam and having its open end disposed substantially normal to the said path of movement.

4. In a sea water evaporator, the combination comprising a substantially vertical shell defining a generally cylindrical primary separating chamber, a wet steam inlet conduit opening substantially tangentially into said primary chamber, transverse wall means in said shell defining a generally cylindrical secondary separating chamber above said primary chamber, a conduit extending through said wall means having a side window opening in said primary chamber and a side window opening in said secondary chamber whereby said conduit will receive whirling, relatively dry steam in said primary chamber and transfer the same to said secondary chamber, means defining a volute passageway in said secondary chamber in communication with the side window opening in said conduit, said passageway extending in the direction of whirl of said relatively dry steam and having a discharge opening disposed in a substantially radial plane in the secondary chamber and disposed in spaced relationship to the walls of the secondary chamber, and an open end steam outlet conduit extending into said secondary chamber and upstream a substantial distance with respect to the path of movement of said relatively dry steam, the open end of said outlet conduit being disposed in spaced relationship to the walls of said secondary chamber in a substantially radial plane and facing into the said path of movement, the last mentioned radial plane being separated from the first mentioned plane by at least 170°.

5. A steam and water separator comprising a generally cylindrical and vertically disposed shell having a pair of spaced apart transverse walls defining a separating chamber therebetween, a centrally disposed inlet conduit for a steam and water mixture extending into said chamber from one of said transverse walls, means secured to said inlet conduit within said chamber defining a generally horizontal volute passageway in communication with the conduit and having an outlet disposed in spaced relationship to said shell and said transverse walls in a substantially radial plane in the chamber whereby the steam and water mixture is introduced to the chamber in a whirling path of movement, a plate disposed across the upper portion of said outlet and constructed and arranged to prevent upward movement of the whirling stream, a steam outlet conduit extending through said shell and into the chamber in a generally horizontal plane, said outlet conduit having an open end spaced from said inlet conduit and said shell and said transverse walls in a substantially radial plane in the chamber and facing upstream with respect to the path of movement of the mixture, and the open end of said outlet conduit being spaced from the outlet of said volute passageway through an arc of at least 170°.

6. A steam and water separator comprising a generally cylindrical and vertically disposed shell having upper and lower transverse walls defining a separating chamber therebetween, a substantially vertical inlet conduit for a steam and water mixture disposed substantially centrally of the lower transverse wall, a substantially horizontal volute conduit connected with said inlet conduit and in spaced relationship to said shell and said transverse walls and having an open end disposed substantially radially in said separating chamber whereby the steam and water mixture is introduced to the separating chamber in a whirling stream, and a substantially horizontal steam outlet conduit extending through said shell into the chamber and having an open end spaced from the shell and said transverse walls in a substantially radial plane in the chamber and facing upstream with respect to the path of movement of the said stream, the said open end of the outlet conduit being spaced from the open end of the volute conduit through an arc falling within the range of approximately 170° to approximately 210°.

7. A steam and water separator comprising a generally cylindrical and vertically disposed shell having upper and lower transverse walls defining a separating chamber, the lower transverse wall having a sloping surface to drain water from the chamber, a substantially vertical inlet conduit for a steam and water mixture disposed substantially centrally of said lower transverse wall, a substantially horizontal volute conduit connected with said inlet conduit and in spaced relationship to the shell and said transverse walls and having an open end disposed substantially radially in said separating chamber whereby the steam and water mixture is introduced to the separating chamber in a whirling stream, a substantially horizontal steam outlet conduit extending through said shell into the chamber and having an open end spaced from the shell and said transverse walls in a substantially radial plane in the chamber and facing upstream with respect to the path of movement of the said stream, the said open end of the outlet conduit being spaced from the open end of the volute conduit through an arc falling within the range of approximately 170° to approximately 210°, a perforate plate disposed transversely of said shell above said lower transverse wall to prevent water splashing into said chamber, and an imperforate plate covering a portion of said perforate plate below said open end of said outlet conduit to prevent the withdrawal of water into the chamber and said outlet conduit.

8. A secondary separator for a sea water evaporator of the type having a substantially vertical shell closed at its upper end by a transverse header and defining a primary centrifugal separating chamber having a vertical outlet conduit extending through the central portion of said header, the said secondary separator comprising a dome-like shell secured to the upper end of the evaporator shell and having a substantially horizontal volute conduit engageable with the open end of said vertical conduit and supported in spaced relationship within said dome-like shell, said volute conduit being spaced from said end header and from the walls of the dome-like shell to introduce a steam and water mixture to the secondary separator in a whirling stream, the open end of said volute conduit being disposed in a substantially radial plane in said dome-like shell, and a steam outlet conduit extending substantially horizontally into said dome-like shell, said steam outlet conduit having an open end spaced from said volute conduit and from the walls of said dome-like shell and said header in a substantially radial plane in the dome-like shell and facing upstream with respect to the path of movement of the said whirling stream.

References Cited in the file of this patent

UNITED STATES PATENTS

| 481,518 | Woodbridge | Aug. 23, 1892 |
| 684,299 | Olsen | Oct. 8, 1901 |
| 1,116,403 | Fernoch | Nov. 10, 1914 |
| 2,080,146 | McCoy | May 11, 1937 |
| 2,157,829 | Metzgar | May 9, 1939 |
| 2,452,465 | Hughes | Oct. 26, 1948 |
| 2,473,602 | Loumiet et al. | June 21, 1949 |
| 2,489,903 | Kraft et al. | Nov. 29, 1949 |
| 2,616,563 | Hebb | Nov. 4, 1952 |
| 2,649,408 | Williamson et al. | Aug. 18, 1953 |

FOREIGN PATENTS

| 17,612 | Great Britain | Aug. 4, 1906 |
| 42,715 | Sweden | Nov. 16, 1915 |